(12) United States Patent
Heitz et al.

(10) Patent No.: US 8,578,763 B2
(45) Date of Patent: Nov. 12, 2013

(54) SYSTEM AND METHOD FOR FUEL SYSTEM HEALTH MONITORING

(75) Inventors: Steven A. Heitz, Rockford, IL (US); Richard A. Poisson, Avon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 102 days.

(21) Appl. No.: 13/166,253

(22) Filed: Jun. 22, 2011

(65) Prior Publication Data

US 2012/0325348 A1 Dec. 27, 2012

(51) Int. Cl.
*G01M 15/14* (2006.01)
*G01M 15/00* (2006.01)

(52) U.S. Cl.
USPC ..................... 73/114.41; 73/112.01

(58) Field of Classification Search
USPC .......................... 73/112.01, 114.41
See application file for complete search history.

(56) References Cited

U.S. PATENT DOCUMENTS

| | | | |
|---|---|---|---|
| 7,131,274 B2* | 11/2006 | Baryshnikov et al. | 60/772 |
| 7,234,293 B2* | 6/2007 | Yates et al. | 60/39.281 |
| 7,431,569 B2* | 10/2008 | Griffiths | 417/53 |
| 7,481,102 B2* | 1/2009 | Bickley | 73/114.41 |
| 7,762,080 B2* | 7/2010 | Anson et al. | 60/772 |
| 8,205,597 B2* | 6/2012 | Brocard et al. | 123/457 |
| 2001/0052338 A1* | 12/2001 | Yates | 123/506 |
| 2005/0111988 A1* | 5/2005 | Griffiths | 417/53 |
| 2007/0107435 A1* | 5/2007 | Bickley | 60/773 |
| 2010/0115959 A1* | 5/2010 | Anson et al. | 60/772 |
| 2010/0257867 A1* | 10/2010 | Aurousseau et al. | 60/779 |
| 2011/0206539 A1* | 8/2011 | Mori et al. | 417/42 |
| 2012/0085421 A1* | 4/2012 | Bickley | 137/2 |
| 2012/0219429 A1* | 8/2012 | Heitz | 417/44.1 |
| 2012/0271527 A1* | 10/2012 | Zebrowski et al. | 701/100 |

FOREIGN PATENT DOCUMENTS

| EP | 1522731 A2 | 4/2005 |
|---|---|---|
| EP | 1785348 A2 | 5/2007 |

\* cited by examiner

*Primary Examiner* — Freddie Kirkland, III
(74) *Attorney, Agent, or Firm* — Cantor Colburn LLP

(57) ABSTRACT

A method of monitoring operation of a fuel system includes urging a fuel flow from a fuel source toward a pressure regulating valve via a fuel pump. A pressure of the fuel flow is detected at the pressure regulating valve, and a pump speed required to produce a selected pressure at the pressure regulating valve is detected. The pump speed is compared to a range of acceptable pump speeds, and an operational status of the fuel pump is determined based on a result of the comparison.

11 Claims, 1 Drawing Sheet

SYSTEM AND METHOD FOR FUEL SYSTEM HEALTH MONITORING

BACKGROUND OF THE INVENTION

The subject matter disclosed herein relates to fuel delivery systems. More specifically, the subject matter disclosed herein relates to health monitoring of components of fuel delivery systems.

Fuel delivery systems for an aircraft, for example, include a pump which delivers fuel to a fuel metering valve. Over time, the pump wear results in performance deterioration including reduced flow through the pump and reduced pressure differential across the system. Reduced flow and reduced pressure differential result in loss of accuracy in fuel metering, and can cause an engine "no start" when pump performance drops below the minimum flow to start an engine to which it supplies fuel. Such conditions can result in flight delays. Accordingly, pumps are typically replaced after a predetermined number of hours of operation. This replacement on fixed intervals, however, can result in pumps being replaced that still have servicable life remaining, or alternatively pumps being replaced long after their accuracy has deteriorated.

BRIEF DESCRIPTION OF THE INVENTION

A method of monitoring operation of a fuel system includes urging a fuel flow from a fuel source toward a pressure regulating valve via a fuel pump. A pressure of the fuel flow is detected at the pressure regulating valve, and a pump speed required to produce a selected pressure at the pressure regulating valve is detected. The pump speed is compared to a range of acceptable pump speeds, and an operational status of the fuel pump is determined based on a result of the comparison.

A fuel delivery system includes a fuel pump and a fuel metering valve in flow communication with the fuel pump to meter a fuel flow from the fuel pump. A pressure regulating valve is positioned between the fuel pump and the fuel metering valve to regulate a pressure of the fuel flow to the fuel metering valve. A fuel system monitor to detects a pump operational speed at startup of the fuel system.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic view of a fuel delivery system.

Figure 1:
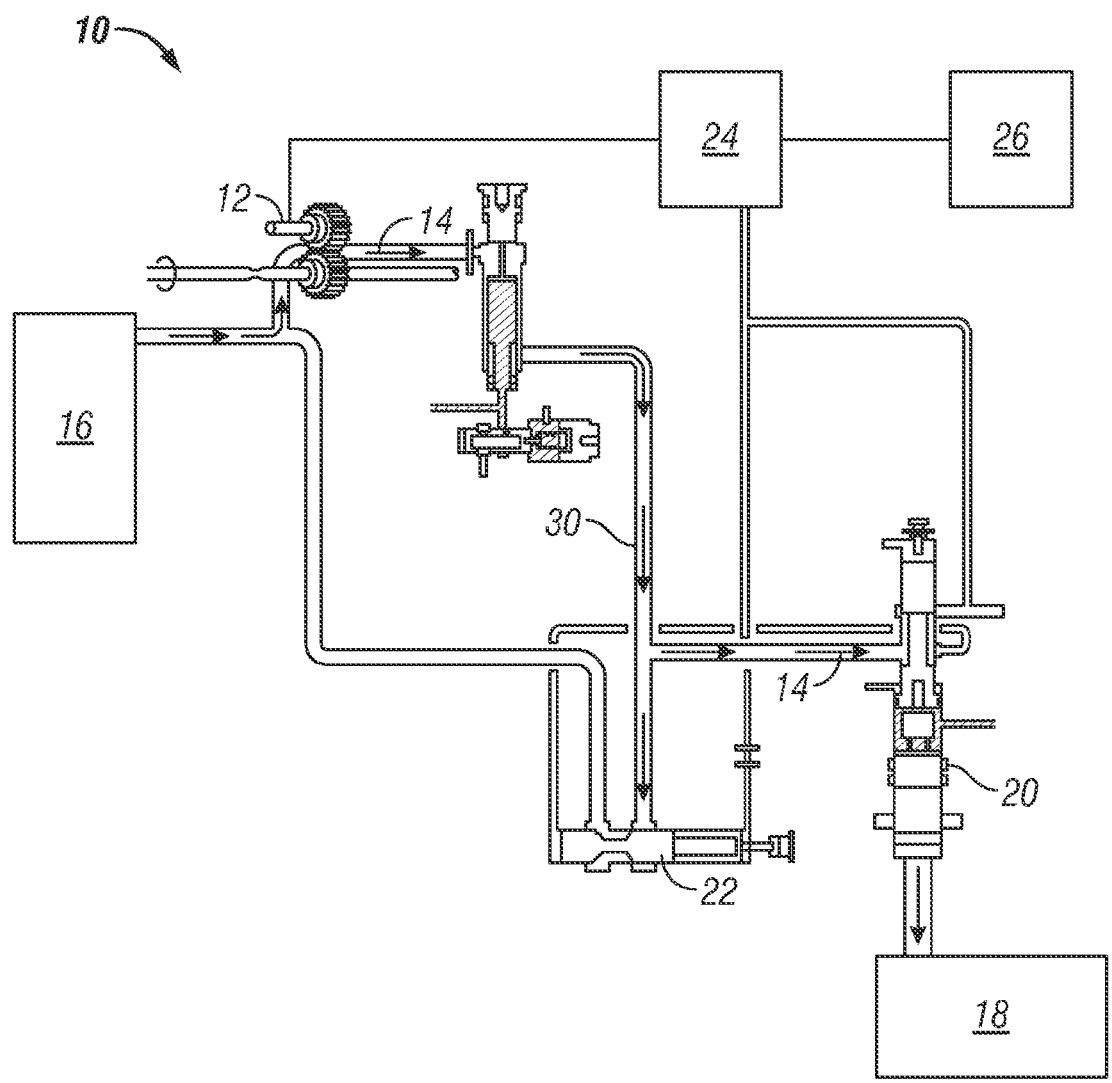

The detailed description explains embodiments of the invention, together with advantages and features, by way of example with reference to the drawings.

DETAILED DESCRIPTION OF THE INVENTION

Shown in the FIGURE is an embodiment of a fuel delivery system 10 for, for example, an aircraft or other vehicle. The system 10 includes a main pump 12 which urges a fuel flow 14 from a fuel source 16, such as a tank or other vessel, toward an engine 18 or other component. In one embodiment, the main pump 12 is a positive displacement pump.

A metering valve 20 is located between the engine 18 and the main pump 12 to meter the fuel flow 14 to the engine 18. A pressure regulating valve (PRV) 22 is located along a fuel pathway 30 between the main pump 12 and the metering valve 20. The PRV 22 regulates pressure of the fuel flow 14 through the metering valve 20 to a desired level.

During startup of the engine 18, the PRV 22 and the metering valve 20 are closed until a required fuel system 10 pressure builds up. The pressure is built via operation of the main pump 12 while the valves 20, 22 are closed. When the pressure meets the required fuel system pressure, the PRV 22 automatically opens thus allowing the fuel flow 14 through the PRV 22 to the metering valve 20.

In fuel systems 10 with positive displacement main pumps 12, pump mass flow is proportional to an operational speed of the pump 12; a higher pump speed results in higher pump mass flow. When operating correctly, the pump 12 operates at a first operational speed to result in the required opening pressure at the PRV 22. As the pump 12 wears, however, leakage in and around the pump 12 requires the pump 12 to operate at a second operational speed, higher than the first operational speed, to pressurize the system 10 to the required pressure at the PRV 22.

To monitor the condition of pump 12, pump 12 speed and PRV 22 pressure are monitored during engine 18 startup by a fuel system monitor 24. The fuel system monitor 24 observes the operational speed of the pump 12 required to bring system pressure at the PRV 22 to the required pressure. The observed operational speed of the pump 12 is compared to a range of acceptable operational speeds. If the observed operational speed is at a higher level than allowed by the range it indicates a need for pump maintenance, repair or replacement, depending on the range.

In some embodiments, the system 10 is connected to a device, for example, an electronic device 26 such as a computer or the like. The electronic device may control the monitor 24 in determining PRV 22 pressure and/or the pump 12 speed, and may perform the comparison between the pump 12 speed and the range of acceptable operational speeds. Further, the electronic device 26 may give an indication, such as an alarm, flashing light, text on a screen, etc, of an operation status of the pump 12 and whether pump maintenance, repair or replacement is necessary.

Monitoring the pump 12 speed and PRV 22 pressure at engine 18 startup as described herein provides an accurate means of assessing and monitoring pump 12 health and wear. The status of the pump 12 is known every time the engine 18 is started and the assessment allows the operator to accurately predict how far the pump 12 is from a failure to start. The trend in pump 12 speed is monitored and the pump 12 is replaced prior to a failure to start occurring. The continuous assessment allows replacement to be scheduled without resulting in flight delays.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of monitoring operation of a fuel system comprising:
   urging a fuel flow from a fuel source toward a closed pressure regulating valve via a fuel pump;
   detecting a pressure of the fuel flow at the pressure regulating valve;
   opening the closed pressure regulating valve at a selected pressure thereby allowing the fuel flow therethrough;
   urging the fuel flow through the pressure regulating valve toward a fuel metering valve;
   detecting a pump speed of the fuel pump required to produce the selected pressure at the pressure regulating valve;
   comparing the pump speed to a range of acceptable pump speeds; and
   evaluating an operational status of the fuel pump based on the result of the comparison.

2. The method of claim 1, wherein a pump speed outside of the range of acceptable pump speeds is indicative of wear of the pump.

3. The method of claim 1, wherein a higher pump speed is indicative of a greater level of wear of the pump.

4. The method of claim 1, further comprising indicating the operational status of the fuel pump at an electronic device in operable communication with the fuel system.

5. A fuel delivery system comprising:
   a fuel pump;
   a fuel metering valve in flow communication with the fuel pump to meter a fuel flow from the fuel pump;
   a pressure regulating valve disposed between the fuel pump and the fuel metering valve to regulate a pressure of the fuel flow to the fuel metering valve, the pressure regulating valve in a closed position during startup of the fuel delivery system, and opened at a selected pressure to allow the fuel flow therethrough; and
   a fuel system monitor to detect a pump operational speed the selected pressure.

6. The fuel delivery system of claim 5, wherein the fuel system monitor detects a pump operational speed required to pressurize the fuel flow at the pressure regulating valve to a selected pressure.

7. The fuel delivery system of claim 5, wherein the pump operational speed is indicative of a level of wear of the fuel pump.

8. The fuel delivery system of claim 7, wherein a higher pump operational speed indicates a higher level of wear.

9. The fuel delivery system of claim 5, wherein the monitor compares the pump operational speed to a range of acceptable pump operational speeds.

10. The fuel delivery system of claim 5, wherein the fuel pump is a positive displacement pump.

11. A method of operating a fuel system comprising:
    urging a fuel flow from a fuel source toward a closed pressure regulating valve via a fuel pump;
    detecting a pressure of the fuel flow at the pressure regulating valve;
    opening the closed pressure regulating valve when the detected pressure is at a selected pressure;
    detecting a pump speed of the fuel pump required to produce the selected pressure at the pressure regulating valve;
    urging the fuel flow through the pressure regulating valve toward a fuel metering valve;
    comparing the pump speed to a predetermined range of acceptable pump speeds; and
    performing one of pump maintenance, repair or replacement when the pump speed falls outside of the predetermined range.

* * * * *